United States Patent [19]

Bealle et al.

[11] 3,750,274

[45] Aug. 7, 1973

[54] METHOD OF MAKING GLASS BONDED RECORDING HEADS

[75] Inventors: John Bealle; John H. Cash, Jr., both of Richardson, Tex.

[73] Assignee: Texas Instruments Incorporated, Dallas, Tex.

[22] Filed: May 28, 1971

[21] Appl. No.: 148,038

[52] U.S. Cl. ............................ 29/603, 179/100.2 C
[51] Int. Cl. ............................ G11b 5/42, H01f 7/06
[58] Field of Search ................ 29/603; 179/100.2 C

[56] References Cited

UNITED STATES PATENTS

| | | | |
|---|---|---|---|
| 3,187,411 | 6/1965 | Duinker et al. | 29/603 |
| 3,246,383 | 4/1966 | Peloscheck et al. | 29/603 |
| 3,402,463 | 9/1968 | Bos et al. | 29/603 |
| 3,593,414 | 7/1971 | Beun et al. | 29/603 |
| 3,605,259 | 9/1971 | Tawara et al. | 29/603 |
| 3,613,228 | 10/1971 | Cook et al. | 29/603 |
| 3,543,396 | 12/1970 | Illg et al. | 29/603 |
| 2,919,312 | 12/1959 | Rosenberger et al. | 179/100.2 C |
| 3,688,056 | 8/1972 | Wiseley et al. | 179/100.2 C |
| 3,706,132 | 12/1972 | Weaver | 179/100.2 C X |
| 3,494,026 | 2/1970 | Sugaya | 29/603 |

FOREIGN PATENTS OR APPLICATIONS

| | | | |
|---|---|---|---|
| 860,230 | 1/1971 | Canada | 29/603 |

*Primary Examiner*—J. Spencer Overholser
*Assistant Examiner*—Ronald J. Shore
*Attorney*—James O. Dixon, Andrew M. Hassell, Harold Levine, Rene E. Grossman and James T. Comfort

[57] ABSTRACT

Disclosed is a method of fabricating recording heads, or transducers, for an electromagnetic recording device, and the resulting product. In a preferred embodiment, a pair of selectively geometric ferrite slabs, e.g., having a beveled edge, are selectively positioned and spaced apart by a sheet of nonmagnetic metallic foil of a desired gap thickness. Low melting temperature glass is inserted in each of two grooves formed by the beveled edges at opposite edges of the ferrite slabs. The structure is placed in a furnace and the glass is melted to fill the grooves, thus bonding the slabs together. The structure is then severed into a plurality of recording heads of the desired size and shape.

8 Claims, 4 Drawing Figures

PATENTED AUG 7 1973 3,750,274

INVENTORS
John Bealle
John H. Cash, Jr.

BY Jim Comfort
ATTORNEY

METHOD OF MAKING GLASS BONDED RECORDING HEADS

This invention relates generally to recording heads for electromagnetic recording devices, and, more particularly, to an improved method of fabricating recording heads.

The gap width in a magnetic recording head is a critical parameter for desired operation. Provision of a narrow gap width will result in highly concentrated magnetic flux lines, thus enhancing the resolution of the head. For high speed-high density recording, such as in disk and drum memories, high resolution is essential. Thus there is a need for a relatively simple, economical method of producing recording heads having an accurately controlled narrow gap width.

One method of making recording heads heretofore used comprises bonding two ferrite pieces together with glass. According to this method, the width of the glass bond establishes the effective gap width. However, yield of the glass bonded method wherein the glass establishes the effective gap width is very low, since it is very difficult to accurately control the gap width. Another problem of this method is that constituents of the glass tend to diffuse into the ferrite, significantly reducing its permeability and thus increasing the effective gap width.

However, glass bonded recording heads have certain advantages over those heads which employ other bonding materials, such as, for example, epoxy. Glass forms a more effective bond to reliably hold the ferrite pieces together, providing a stable gap width, and more effectively fills the desired regions without leaving pores or holes. Glass bonded heads withstand polishing and handling better than epoxy bonded heads. Also, epoxy bonded heads cannot be heated after they are bonded, which seriously restricts subsequent manufacturing operations.

According to the method of this invention, two ferrite pole pieces are bonded together with glass while employing a thin layer of nonmagnetic metal to establish the effective gap width. Thus the advantages of glass bonding are obtained in a method in which the gap width is easily and effectively controlled. An additional advantage is the high eleectrical conductivity provided by the metallic layer in the head. During operation, eddy currents will be induced in this metallic layer which will more effectively force the magnetic flux lines out around the fringe area of the head, thus enhancing the coupling efficiency. Such a head can also be employed in a recording device of the type in which an electrical current is transmitted through the gap region of the head. Diffusion of the glass constituents into the ferrite in the gap region is also avoided.

It is an object of the invention to provide a new method of making recording heads.

It is a further object of the invention to provide a method of making a glass bonded recording head which employs a nonmagnetic metallic layer to establish the effective gap width, and the resulting product.

Other objects and advantages will become apparent from the following detailed description and drawings in which.

Figures 1, 2, 3, 4:
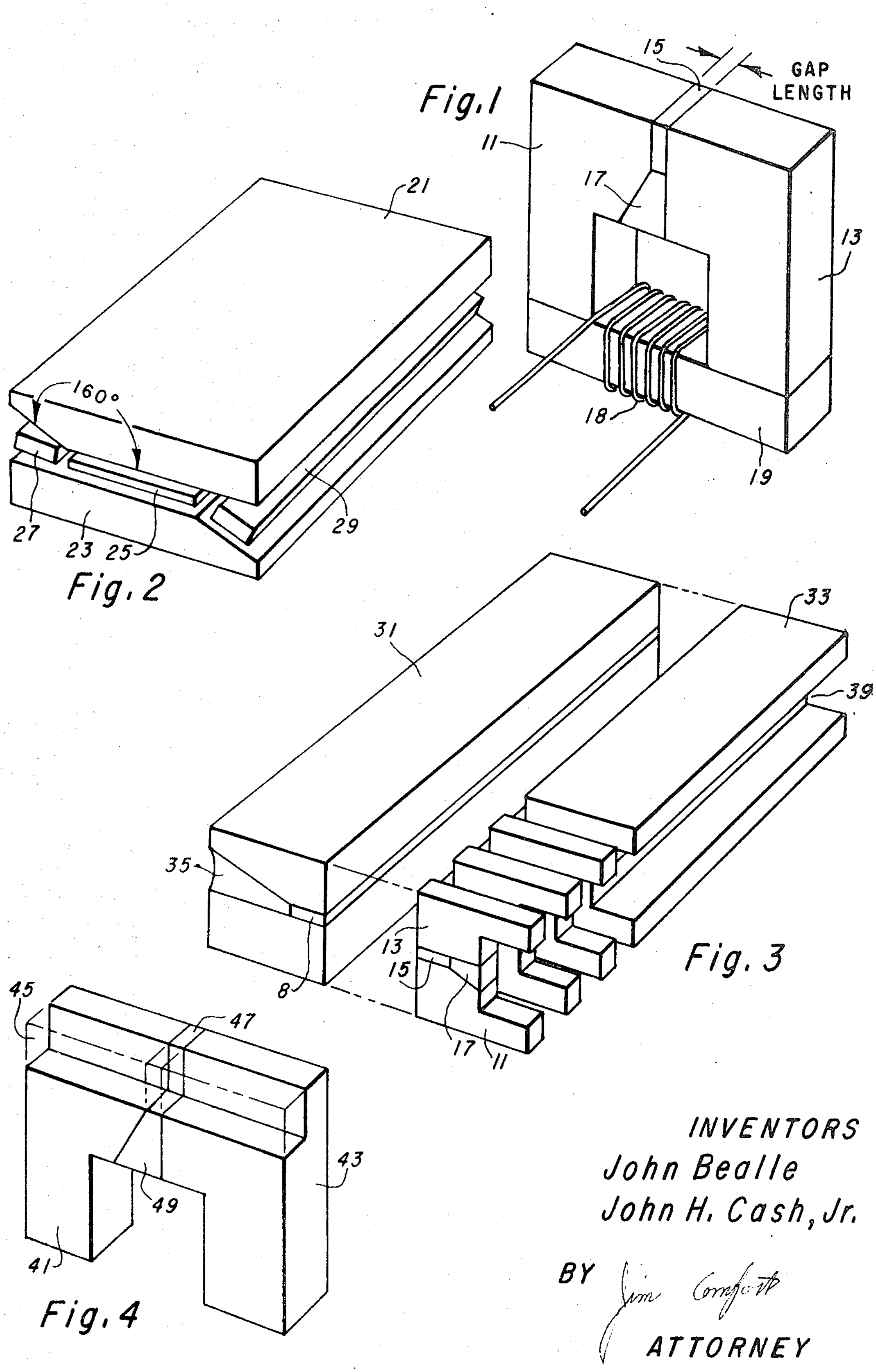
FIG. 1 is an isometric view of a recording head fabricated according to the method of the invention.
FIG. 2 is an isometric illustration of a preferred fabrication process, wherein two ferrite slabs are selectively spaced apart by nonmagnetic metallic foil and glass rods are inserted in grooves at opposite edges of the ferrite slabs.
FIG. 3 illustrates the severance of the structure into individual recording heads after the glass has been fired.
FIG. 4 illustrates a preferred recording head wherein the effective head width is less than the total head width.

Referring now to FIG. 1, a recording head made according to the method of the invention is illustrated. The recording head includes a pole piece comprised of ferrite pieces 11 and 13 which are bonded together by glass in region 17, with a nonmagnetic metallic layer 15 establishing the effective gap width (the gap width in the drawings is disproportionately large for purposes of illustration). The recording head, as utilized, further is comprised of ferrite bar 19 extending across the spaced apart region of the pole piece, and having coils 18 wrapped therearound. The nonmagnetic layer 15 provides a high reluctance path in the magnetic circuit. Thus a magnetic fringing field induced in the gap vicinity couples into and magnetizes a recording medium (not shown) in the write mode. In the read mode, a magnetic flux pattern presented by a recording medium couples through the gap region into the head magnetic circuit.

The preferred method of the invention is illustrated in FIGS. 2 and 3. Two identical ferrite slabs 21 and 23 are spaced apart by a nonmagnetic metallic foil 25 and are clamped together in this configuration, typically with about thirty inch-pounds of pressure. Each of the ferrite slabs has a beveled edge at one surface thereof typically forming about a 20° acute angle from the horizontal. The surface of each slab abutting the foil is polished optically flat. The slabs are selectively positioned so that the bevels are spaced at opposite sides. Glass bars 27 and 29 are then placed in the open regions formed by the beveled edges. The structure is then inserted into a furnace and heated sufficiently to melt the glass and thus bond the ferrite slabs together. The pressure applied via the clamp (not shown) is sufficient to prevent the molten glass from entering the gap region wherein the foil is located. The structure is removed from the furnace and then severed into two identical pieces such as 31 in FIG. 3. The glass has melted and filled the region 35 formed by the bevel. A region 39 is then removed and the structure 33 is secured to a graphite block, e.g., with wax, and then severed into individual recording heads.

A preferred embodiment of a magnetic recording head is illustrated in FIG. 4. The head comprises pole pieces 41 and 43 bonded together by glass 49 and selectively spaced apart by nonmagnetic metallic layer 47. In this head, a region 45 has been removed, thus decreasing the effective width of the head. The region which is removed preferably extends at least as deep as does the metallic layer so that the effective gap area is controlled and an additional tolerance is not introduced. By reducing the effective width of the head, less area is utilized on a recording medium and thus higher density packing on a medium is obtained. If the recording heads are initially made to such narrow width, the yield is substantially reduced, since breakage of such narrow ferrite pieces frequently occurs. Substantially higher yields are obtained by initially cutting the heads to a wider thickness and then removing a region near the recording surface. Diamond edge cutting and grinding tools are employed throughout the process, as ferrite is very hard and brittle and the small size of structures further increases the likelihood of breakage.

The nonmagnetic metallic layer may be comprised of such material as beryllium copper, platinum or silver, although Havar, a proprietary metal produced by Hamilton Watch Company, is preferred. The thickness of the layer will depend upon the desired effective gap width and may typically be about 0.1 mil.

The composition of the ferrite material employed will depend upon the desired frequency range of operation. For higher frequencies, a manganese-zinc ferrite is preferred since it has a high permeability at high frequencies (to about 3 MHz). Ferrite material with various combinations of permeability and expansion rate are commercially available. An example of a preferred type of manganese-zinc ferrite is J-ferrite, manufactured and supplied by Magnetics, Incorporated of Butler, Pennsylvania.

A low melting point glass having an expansion rate which substantially matches the expansion rate of the ferrite is employed. If the expansion rate of the glass does not approximately match that of the ferrite then the glass may crack when heated. High melting temperature glass is undesirable, since heating the ferrite to excessive temperatures will adversely affect the permeability of ferrite. It has been found that temperatures under about 550°C are desirable. Satisfactory low melting point glasses typically comprise a high concentration of lead. An example of such a satisfactory glass is glass code No. 8363 manufactured by Corning Glassware Incorporated. This glass melts as low as 460°C, but has been most satisfactorily employed at about 495°C. The rate of expansion of this glass is about $10.4 \times 10^{-6}$ inches per inch per degrees Centrigrade (between 0°C and 300°C), as compared to a typical manganese-zinc ferrite expansion rate of about $9.8 \times 10^{-6}$ inches per inch per degrees Centigrade (between 0°C and 550°C). Another glass which has been satisfactorily employed comprises respective weight percentages of 55% PbO, 30% PbF2, 5% B203, and 10% SiO2. This glass melts at about 550° Centigrade. A glass having a desired melting point and expansion rate can be selected from various commercial sources.

It has been found that degradation of permeability of the ferrite is lessened by heating the structure in an inert atmosphere, such as a nitrogen atmosphere, when the glass is fired. This enables a higher melting point glass to be used in the process, if desired. Ferrite heads may be heated substantially higher than 550°C in an inert atmosphere without substantial degradation in permeability.

Although a simple and economical preferred embodiment of the invention has been described herein, it should be noted that incorporation of the glass and metallic layer is not limited to the disclosed technique. For example, a metallic layer could be selectively deposited on one or both pole pieces utilizing conventional sputtering or evaporation techniques. Also, the glass may be in the form of a slurry or frit rather than the preferred rod.

The description herein is intended only as an illustration of the invention and is not to be interpreted as a limitation, as various modifications within the scope of the invention may now suggest themselves to those skilled in the art.

What is claimed is:

1. A method of fabricating electromagnetic recording heads comprising:

a. selectively positioning a thin nonmagnetic metallic foil between two selectively geometric ferrite slabs, said metallic foil having a thickness equal to the desired effective gap width of the recording head and positioned throughout the length of said ferrite slabs in said gap;

b. compressing the structure to hold the foil in position and establish the effective gap width;

c. incorporating glass in regions adjacent to said metallic foil positioned in said gap, at opposite edges of the structure;

d. selectively heating the compressed structure to melt the glass so that it fills said regions and binds the slabs together after cooling ,said compressing causing sufficient pressure to prevent the molten glass from entering the gap region wherein the foil is located; and e. selectively severing the structure into a plurality of recording heads, each of said recording heads being comprised of two ferrite pole pieces bonded together with glass and having a nonmagnetic metallic foil establishing the effective gap width and in said gap.

2. The method of claim 1 wherein the nonmagnetic metallic foil is selected from Havar, beryllium copper, platinum or silver.

3. The method of claim 1 wherein the thickness of the nonmagnetic metallic foil is approximately 0.1 mil.

4. The method of claim 1 wherein the structure is compressed with a pressure on the order of 30 inch-pounds.

5. The method of claim 1 wherein the structure is heated to a temperature not exceeding about 550°C.

6. The method of claim 1 wherein the structure is heated in an inert atmosphere.

7. The method of claim 1 further including selectively removing a region of each recording head at the recording surface to reduce the effective head width.

8. A method of fabricating glass bonded electromagnetic recording heads having an effective gap width determined by the thickness of a nonmagnetic metallic layer, comprising:

a. selectively locating a thin nonmagnetic metallic layer between two ferrite slabs, said metallic layer having thickness equal to the desired effective gap width of the recording heads and at least one of said ferrite slabs having a beveled edge and both thereof having an optically flat surface abutting said metallic layer said metallic layer positioned throughout the length of said ferrite slabs;

b. compressing the structure to hold the metallic layer in position and establish the effective gap width;

c. positioning a glass rod in an open region at each of the beveled edges adjacent to said metallic layer;

d. placing the compressed structure in a furnace and heating it to a temperature slightly above the melting point of the glass, said compressing causing sufficient pressure to prevent the molten glass from entering the gap region wherein the foil is located, and e. removing the structure from the furnace, cooling it, and then selectively severing it into a plurality of recording heads of the desired size and shape.

* * * * *